United States Patent [19]
Harman et al.

[11] 3,733,940
[45] May 22, 1973

[54] LATHES

[75] Inventors: Julius Harman, Baginton; Michael Eric Norman, Holly Croft, both of England

[73] Assignee: Alfred Herbert Limited, Coventry, England

[22] Filed: Apr. 8, 1971

[21] Appl. No.: 132,529

[30] Foreign Application Priority Data
Apr. 10, 1970   Great Britain.....................17,117/70

[52] U.S. Cl. ....................82/21 R, 82/27, 74/424.8 R
[51] Int. Cl. ............................................B23b 21/00
[58] Field of Search............................82/27, 21–23; 74/424.8 R

[56] References Cited
UNITED STATES PATENTS

| | | | |
|---|---|---|---|
| 1,340,811 | 5/1920 | Ballman | 82/21 |
| 2,368,408 | 1/1945 | Brooking | 82/21 |
| 3,269,199 | 8/1966 | Deehan et al. | 74/424.8 R |

*Primary Examiner*—Leonidas Vlachos
*Attorney*—Holman & Stern

[57] ABSTRACT

A lathe is provided in the feed drive to its saddle with a yieldable joint which absorbs shock loads. The joint may be incorporated in a nut assembly which is displaceable along a leadscrew and is connected to the saddle. The nut assembly comprises a housing, a pair of separate nut portions in the housing and prestressed resilient devices holding in position a pair of abutments through which axial thrust is transmitted from the nut portions to the housings.

20 Claims, 5 Drawing Figures

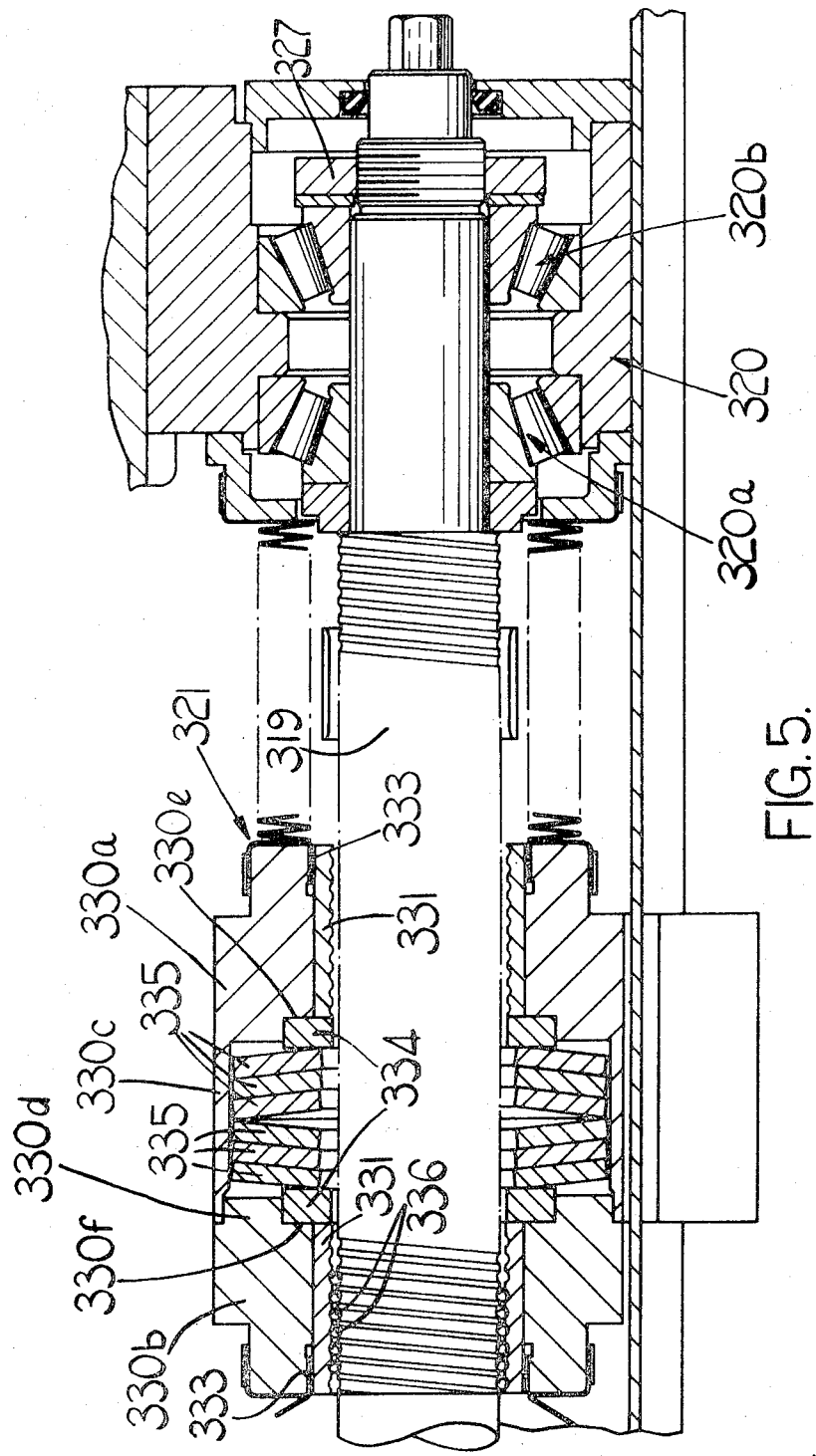

LATHES

This invention relates to lathes and has an object to provide a lathe in a convenient form.

A lathe in accordance with the invention comprises a frame, a power driven work spindle mounted on the frame, tool support means movably mounted on the frame and drive means for moving said tool support means relative to the frame, said drive means incorporating a resiliently yieldable joint prestressed to prevent yielding thereof in normal machining conditions but capable of yielding in the event of a collision between the tool support means or a tool thereon with any other part of the lathe or a workpiece carried by the work spindle during movement of said tool support means by said drive means.

The invention also resides in a shock absorbing device for use in conjunction with a leadscrew comprising a nut housing, a pair of internally threaded nut members mounted within the housing for coacting with the leadscrew at two axially spaced positions thereon, said nut members being axially movable relative to the housing, but non-rotatable relative thereto, a pair of movable abutments in the housing against which the nut members abut respectively and prestressed resilient means in the housing acting in opposite axial directions on said movable abutments to urge the latter against fixed abutments in the housing, whereby when an excessive load is applied to the housing one movable abutment is displaced out of engagement with its associated fixed abutment against the force applied thereto by said resilient means, thereby permitting axial movement of the nut members relative to the housing.

In the accompanying drawings:

FIG. 5 is a another view like FIG. 3 but showing yet another alternative form of the invention.

Figure 1:
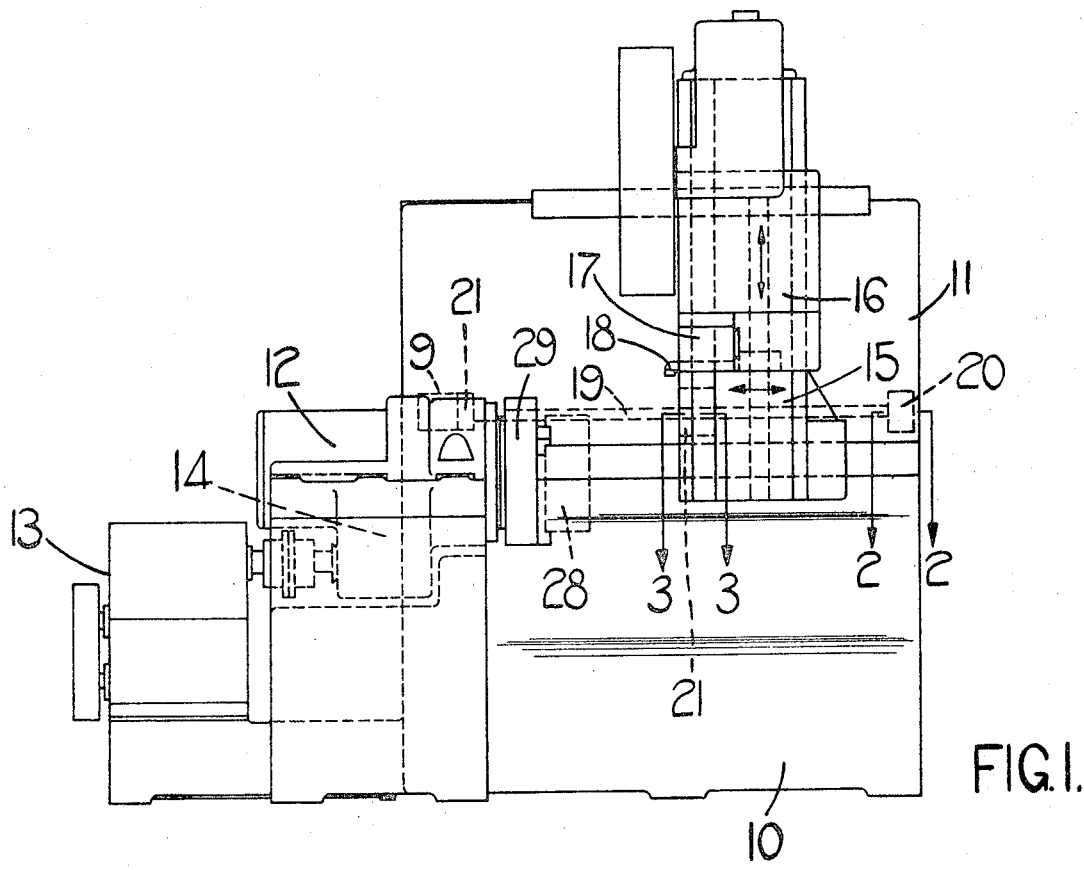
FIG. 1 is an elevation of an example of a lathe in accordance with the invention.

Referring firstly to FIG. 1 the lathe shown includes a frame constituted by a base 10, a bed 11 and a headstock 12. The headstock 12 carries a work spindle driven by an electric motor 13 through a variable speed transmission 14. The bed 11 slidably supports a saddle 15 which itself carries a cross-slide 16 having theron tool mount means 17 for carrying a tool 18.

A leadscrew 19 supported by the lathe frame is used for driving the saddle 15 along the bed. The leadscrew is supported at its ends by bearing blocks 20 and coacts intermediate its ends with a nut assembly 21 fastened to the saddle 15. There is a variable speed motor 9 for driving the leadscrew 19.

Figure 2:
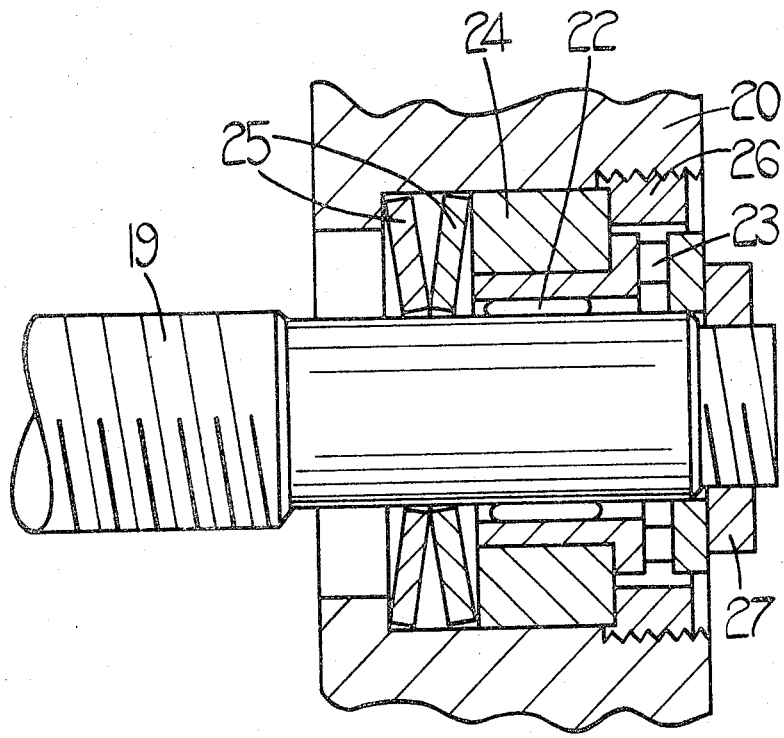
FIG. 2 is an enlarged fragmentary section on line 2—2 in FIG. 1.

Turning now to FIG. 2 the leadscrew 19 is supported by a roller bearing 22 and a thrust bearing 23. The roller bearing 22 fits in a bush 24 which is a free sliding fit in a bore in the bearing block 20. Resilient yielding means in the form of a pair of dished disc springs 25 is also located in the bore and an externally threaded ring 26 screw-threadedly engaged with the block 20 provides an adjustable abutment against which the bush 24 is urged by the disc springs 25. The position of the ring 26 is, in fact, adjusted to pre-stress the disc springs to such an extent that they will only be further deformed by forces well in excess of those normally experienced in machining conditions.

The end of the screw 17 is provided with a pre-loaded nut 27 which is tightened against the thrust bearing sufficiently to take any backlash out of the system as is normal practice. The preloading of the bearing 23 is less than the pre-stressing of the disc springs 25.

In use, therefore, if the programming of the control system of the lathe contains an error such that there will be a collision between the tool 18 or the tool mount 17 and a workpiece 28 or a chuck 29 on the spindle carrying the workpiece, the shock loading on the leadscrew will be absorbed by deformation of the disc springs 25. Permanent damage to the lead screw bearings is thus prevented and the accuracy of the control system will not be impaired.

Figure 3:
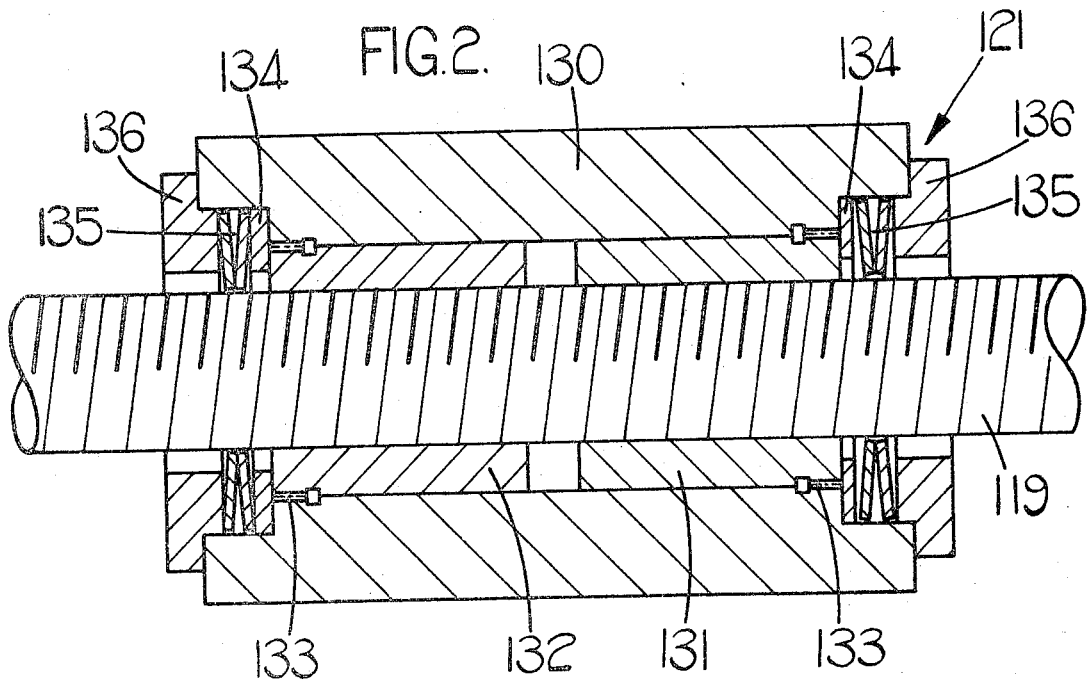
FIG. 3 is a fragmentary section of an alternative form of the invention taken on a line corresponding to line 3—3 in FIG. 1.

In the example shown in FIG. 3, a resilient yielding means is incorporated in the nut assembly 121 instead of in the lead screw bearings. In this case, the nut housing 130, which is secured to the saddle 15 receives two internally threaded nut members 131, 132 respectively. These two members 131, 132 are, as is known, held in angularly adjusted positions relative to one another by a known finely splined vernier device 133 such that the nut members 131, 132 are pre-loaded by their engagement with the lead screw 119 away from one another. The nut members 131, 132 are, in fact, loaded against flat washers 134 held against shoulders at opposite ends of the nut housing 130 by two pairs of dished disc springs 135. These disc springs are held in a pre-stressed condition by clamp members 136.

In the event of a collision tending to cause the nut housing 130 to move to the left relative to the screw 119, the nut member 131 will be displaced relative to the housing compressing the disc springs 134 at the right hand end of the nut housing. These disc springs will thus absorb the shock load. The nut member 132 can, of course, move freely in this direction without compressing the disc springs at the opposite end of the nut housing.

Figure 4:
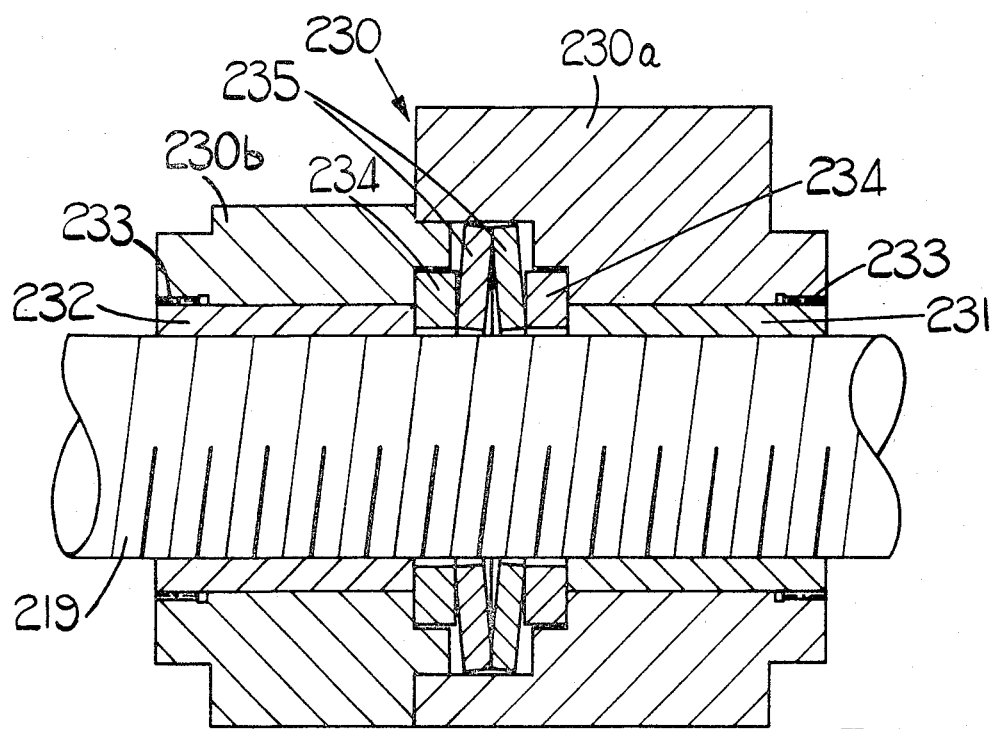
FIG. 4 is a view like FIG. 3 but showing another alternative form of the invention.

In the example shown in FIG. 4, the nut housing 230 is formed in two separate parts 230a, 230b which form between them a cavity which receives a single pair of dished disc springs 235 compressed between washers 234 abutting against shoulders on the two housing parts respectively. The two nut members 231, 232 are pre-loaded inwardly against these washers 234, by adjustment of their verniers 233.

In this case, a shock load carrying the nut housing 232 to the left will be absorbed by the compression of the disc springs 235 following the lifting of the washer 234 on the left of the disc spring 235 from its shoulder by the action of the nut part 232.

FIG. 5 shows both the nut assembly 321 and the bearing 320 for one end of the leadscrew 319. The bearing 320 utilizes two conical roller bearings 320a and 320b and a nut 327 on a threaded end portion of the leadscrew can be used in a known manner for prestressing the bearing, 320.

The nut assembly again includes a nut housing in two parts 320a and 320b. The part 320a is bored out at one end to form a chamber bounded by a sleeve portion 330c integral with the part 330a. A rib 330d on the part 330b fits within the sleeve portion 330c and the two parts are secured together by bolts (not shown). At opposite ends of the chamber fixed abutment shoulders 330e and 330f are formed on the parts 330a and 330b respectively. A pair of movable abutments in the form of rings 334 abut against the shoulders 330e and 330f respectively. The rings 334 are urged strongly against the shoulders by a stack of dished disc springs 335. As shown there are six such springs 335 and these are arranged in two nested groups of three. Each group has all three of its springs 335 dished in the same direction and the springs of the two groups are dished in opposite directions with the outer springs in the stack engaging the rings 334 around the inner peripheries of the springs and with the adjacent springs of the two groups engaging one another. The dimensions of the parts 330a and 330b are such that the distance between the inner faces of the rings 334 is less than the natural length of the stack of springs 335 so that the springs are held in a stressed condition.

The housing parts 330a and 330b contain respectively two internally threaded nut members 331 which are dimensioned so as to be freely axially slidable in the housing. Once again the known, finely splined vernier devices 333 are provided for preventing rotation of the nut members 331 relative to the housing. The vernier devices are set by angularly positioning the nut members when the screw 319 is absent, so that the effect of the balls 336 interposed between the threads of the nut members and the screw will be to urge the nut members towards one another, thereby prestressing the nut assembly in known manner against movement thereof unrelated to rotation of the screw.

The prestressing of the springs 335 is such that the outward load applied to the two rings 334 is very considerably in excess of any load which will be applied, in use, to the nut housing 330a and 330b, but less than the load required to deform any part of the nut assembly or the leadscrew, or, in use, any member connected to either, beyond its elastic limit. The prestressing of the springs 335 could be reduced if required by placing a shim between the end of the sleeve portion 330c and the part 330b. Thus, for normal use, the rings 334 act as fixed abutments for the nut members 331. Under shock load conditions, however, the force momentarily applied by the housing to one of the members 331 may momentarily exceed the limit set by prestressing. For example, a shock load may act to urge the housing 330a and 330b to the right as viewed in FIG. 5. In this case the reaction against load applied by the ring 334 to the member 331 will lift the ring 334 from contact with the shoulder 330e against the force exerted by the springs 335.

The resilient yielding joint may include a fluid pressure operated device or a plastic or elastic deformable member as alternatives to the disc springs utilized in the four examples described.

We claim:

1. A lathe comprising a frame, a power driven spindle mounted on the frame, tool support means movably mounted on the frame and drive means for moving said tool support means relative to the frame, said drive means including a rotatable lead screw and a nut assembly engaged with said lead screw and connected to the tool support means for imparting movement thereto axially of said lead screw and said nut assembly comprising a nut housing connected to the tool support means, a pair of internally threaded nut members mounted in the housing, coacting with the leadscrew at two axially spaced positions thereon and axially movable relative to the housing but non-rotatable relative thereto, a pair of movable abutments in the housing against which the nut members abut respectively and prestressed resilient means in the housing acting in opposite axial directions on said movable abutments to urge the latter against fixed abutments in the housing, whereby when an excessive load is applied to the housing, in the event of a collision between the tool support means or a tool carried thereby with any other part of the lathe or a workpiece carried by the work spindle during movement of said tool support means by said drive means, one movable abutment is displaced out of engagement with its associated fixed abutment against the force applied thereto by said resilient means, thereby permitting axial movement of the nut members relative to the housing.

2. A lathe as claimed in claim 1 in which said abutments are at opposite ends of the nut housing and said resilient means acts on said movable abutments to urge them towards one another.

3. A lathe as claimed in claim 2 in which the resilient means comprises two pairs of disc springs acting respectively against the movable abutments.

4. A lathe as claimed in claim 3 in which the disc springs are held in prestressed condition by a pair of clamping members fitted to opposite ends of the housing.

5. A lathe as claimed in claim 4 in which finely splined vernier devices are provided for holding the nut members in angular positions relative to the housing such that they are urged away from one another into engagement with said movable abutments.

6. A lathe as claimed in claim 1 in which the nut housing is formed in two separate parts defining a chamber at opposite ends of which said fixed abutments are provided, said movable abutments being in said chamber and being urged away from one another by common resilient means interposed between them.

7. A lathe as claimed in claim 6 in which said resilient means comprises a pair of dished disc springs engaged with one another and with the respective movable abutments.

8. A lathe as claimed in claim 6 in which said resilient means comprises a stack of dished disc springs engaged between said movable abutments.

9. A lathe as claimed in claim 7 which the disc springs are arranged in two nested groups.

10. A lathe as claimed in claim 6 in which the nut members have finely splined vernier adjustment devices whereby the nut members are so angularly positioned relative to the housing that this interaction with the lead-screw causes them to be urged towards one another into engagement with the respective movable abutments.

11. A shock absorbing device for use in conjunction with a leadscrew comprising a nut housing, a pair of internally threaded nut members mounted within the housing for coacting with the leadscrew at two axially spaced positions thereon said nut member being axially movable relative to the housing, but non-rotatable relative thereto, a pair of movable abutments in the housing against which the nut members abut respectively and prestressed resilient means in the housing acting in opposite axial directions on said movable abutments to urge the latter against fixed abutments in the housing, whereby when an excessive load is applied to the housing one movable abutment is displaced out of engagement with its associated fixed abutment against the force applied thereto by said resilient means, thereby permitting axial movement of the nut members relative to the housing.

12. A shock absorbing device as claimed in claim 11 in which said abutments are at opposite ends of the nut housing and said resilient means acts on said movable abutments to urge them towards one another.

13. A shock absorbing device as claimed in claim 12 in which the resilient means comprises two pairs of disc springs acting respectively against the movable abutments.

14. A shock absorbing device as claimed in claim 13 in which the disc springs are held in prestressed condition by a pair of clamping members fitted to opposite ends of the housing.

15. A shock absorbing device as claimed in claim 14 in which finely splined vernier devices are provided for holding the nut members in angular positions relative to the housing such that they are urged away from one another into engagement with said movable abutments.

16. A shock absorbing device as claimed in claim 11 in which the nut housing is formed in two separate parts defining a chamber at opposite ends of which said fixed abutments are provided, said movable abutments being in said chamber and being urged away from one another by common resilient means interposed between them.

17. A shock absorbing device as claimed in claim 16 in which said resilient means comprises a pair of dished disc springs engaged with one another and with the respective movable abutments.

18. A shock absorbing device as claimed in claim 16 in which said resilient means comprises a stack of dished disc springs engaged between said movable abutments.

19. A shock absorbing device as claimed in claim 17 in which the disc springs are arranged in two nested groups.

20. A shock absorbing device as claimed in claim 16 in which the nut members have finely splined vernier adjustment devices whereby the nut members are so angularly positioned relative to the housing that their interaction with the leadscrew causes them to be urged towards one another into engagement with the respective movable abutments.

* * * * *